United States Patent [19]

Gilet et al.

[11] Patent Number: 5,829,043
[45] Date of Patent: Oct. 27, 1998

[54] COUPLER CIRCUIT AND ITS USE IN A CARD AND PROCESS

[76] Inventors: Roger Gilet, deceased, late of L'Hay Les Roses, France; by Renale Gilet, administrator, 2, allée des Troënes, l'Haÿ les Roses, France; Pascal Vergnory Mion, 29, rue de l'avant-garde, 93700 Drancy, France

[21] Appl. No.: 747,995

[22] Filed: Nov. 12, 1996

(Under 37 CFR 1.47)

Related U.S. Application Data

[63] Continuation of Ser. No. 133,103, Sep. 28, 1994, abandoned.

[30] Foreign Application Priority Data

Apr. 15, 1991 [FR] France ................................. 91 04598

[51] Int. Cl.$^6$ ................................................. G06F 12/00
[52] U.S. Cl. ........................... 711/154; 711/112; 711/151; 395/732; 395/860
[58] Field of Search ..................... 395/440, 439, 395/250, 860, 478, 728, 494, 842, 433, 732, 481; 711/106, 112, 113, 151, 154, 167

[56] References Cited

U.S. PATENT DOCUMENTS 5,075,805  12/1991  Peddle et al. ............................. 360/61
5,133,060  7/1992  Weber et al. ............................. 395/440
5,239,636  8/1993  Dujari et al. ....................... 364/DIG. 1

FOREIGN PATENT DOCUMENTS 0203601  12/1986  European Pat. Off. .
0354579  2/1990  European Pat. Off. .

OTHER PUBLICATIONS

PC Backup Manual of PC Tools Deluxe, Ver. 6, 1990 pp. 153–154.

*Primary Examiner*—David L. Robertson
*Attorney, Agent, or Firm*—Weingarten, Schurgin, Gagnebin & Hayes LLP

[57] ABSTRACT

An integrated coupler circuit for relieving a microprocessor of directing individual data exchanges between a cache memory, composed of a dynamic read/write memory, and a disk controller and an MCA bus. The integrated coupler circuit provides a means for directing data exchanges between the disk controller and the dynamic cache memory with the highest level of priority after initialization by the microprocessor, refreshing the dynamic cache memory with the second highest level of priority, directing data exchanges between the microprocessor and the dynamic cache memory with the third highest level of priority, and directing data exchanges between the dynamic cache memory and a stack incorporated into the coupler circuit with the lowest level of priority after initialization by the microprocessor.

21 Claims, 12 Drawing Sheets

| BIT | 7 | 6 | 5 | 4 | 3 | 2 | 1 | 0 |
|---|---|---|---|---|---|---|---|---|
| POS 5 | 1 | 1 | RDY | A15 | A14 | A13 | A12 | A11 |
| POS 4 | A10 | A9 | A8 | A7 | A6 | A5 | A4 | A3 |
| POS 3 | BURST | | EARB | FAIR | ARB3 | ARB2 | ARB1 | ARB0 |
| POS 2 | SIZE (ROM) | | SEGMENT (ROM) | | | SIZE (INPUT-OUTPUT) | | ENCD |

402 brackets POS 5–POS 2

| BIT | 7 | 6 | 5 | 4 | 3 | 2 | 1 | 0 |
|---|---|---|---|---|---|---|---|---|
| ATTENTION (403) | DEVICE SELECTOR | | | 0 | ATTENTION CODE | | | |
| IT. STATUS/TYPE (404) | DEVICE SELECTOR | | | 0 | TYPE OF INTERRUPTION | | | |
| BASIC CONTROL (405) | RESET | 0 | 0 | 0 | 0 | 0 | DMA ENB | ITEN |

| BIT | 7 | 6 | 5 | 4 | 3 | 2 | 1 | 0 |
|---|---|---|---|---|---|---|---|---|
| BASIC STATUS (406) | DMA ENB | IRQ PEND | CIP | BUSY | STAT AVAIL | CMD FULL | TRANS REQ | IRQ ON |

| BIT | 7 | 6 | 5 | 4 | 3 | 2 | 1 | 0 |
|---|---|---|---|---|---|---|---|---|
| MODE (494) | RST STAT | RST CMD | //// | TEST | REF | //// | Tps MASK (ESDI) | |

| BIT | 7 | 6 | 5 | 4 | 3 | 2 | 1 | 0 |
|---|---|---|---|---|---|---|---|---|
| STATUS/SOURCE ITGA (4090) | ITP | ITE | ITF | ITTC | REQE | ACTIE | REQF | ACTIF |

| BIT | 7 | 6 | 5 | 4 | 3 | 2 | 1 | 0 |
|---|---|---|---|---|---|---|---|---|
| CTL ITGA (4091) | RST FB | RST P | EN ITE | TEST ITE | EN ITF | RST ITF | EN ITTC | RST ITTC |

FIG. 2C

|   | 7 | 6 | 5 | 4 | 3 | 2 | 1 | 0 |
|---|---|---|---|---|---|---|---|---|
| 046h | ////////////////////// | | | | | A2 | A1 | A0 |
| 045h | A18 | STARTING ADDRESS | | | | | | A11 |
| 044h | A10 | | | | | | | AA3 |

440

|   | 7 | 6 | 5 | 4 | 3 | 2 | 1 | 0 |
|---|---|---|---|---|---|---|---|---|
| 04Eh | ACTIE | SENSE | //////////// | | | A2 | A1 | A0 |
| 04Dh | A18 | ENDING ADDRESS | | | | | | A11 |
| 04Ch | A10 | | | | | | | A3 |

441

|   | 7 | 6 | 5 | 4 | 3 | 2 | 1 | 0 |
|---|---|---|---|---|---|---|---|---|
| 046h | ACTIE | SENSE | EGALE | 0 | 0 | A2 | A1 | A0 |
| 045h | A18 | CURRENT ADDRESS OF THE DISK TRANSFER COUNTER | | | | | | A11 |
| 044h | A10 | | | | | | | AA3 |

4411

|   | 7 | 6 | 5 | 4 | 3 | 2 | 1 | 0 |
|---|---|---|---|---|---|---|---|---|
| 042h | ////////////////////// | | | | | A2 | A1 | //// |
| 041h | A18 | STARTING ADDRESS | | | | | | A11 |
| 040h | A10 | | | | | | | A3 |

444

|   | 7 | 6 | 5 | 4 | 3 | 2 | 1 | 0 |
|---|---|---|---|---|---|---|---|---|
| 04Ah | ACTIF | SENSF | //////////// | | | A2 | A1 | //// |
| 049h | A18 | ENDING ADDRESS | | | | | | A11 |
| 048h | A10 | | | | | | | AA3 |

445

|   | 7 | 6 | 5 | 4 | 3 | 2 | 1 | 0 |
|---|---|---|---|---|---|---|---|---|
| 042h | ACTIF | SENSF | EGALF | 0 | 0 | A2 | A1 | //// |
| 041h | A18 | CURRENT ADDRESS OF THE FIFO TRANSFER COUNTER | | | | | | A11 |
| 040h | A10 | | | | | | | AA3 |

WRITING

| Address | Register |
|---|---|
| 057H | POS0 AND POS1 REGISTERS |
| 056H | |
| 055H | WRITING PORT IN DRAM (16 BITS) |
| 054H | |
| 053H | INTERRUPT STATUS/TYPE (MCA) REGISTER |
| 052H | BASIC STATUS (MCA) REGISTER |
| 051H | TIME MASKING |
| 050H | |
| 04FH | RST STAT \| RST CMD \| \| TEST \| REF \| \| |
| 04EH | ACTE \| SENSF |
| 04DH | DISK STOP |
| 04CH | |
| 04BH | RST FB \| RST P \| EN ITE \| RST ITE \| EN ITF \| RST ITF \| EN ITTC \| RST ITTC |
| 04AH | ACTE \| SENSF |
| 049H | FIFO STOP |
| 048H | |
| 047H | BASIC TIME SECTOR OF DISK 2 |
| 046H | |
| 045H | DISK TRANSFER COUNTER |
| 044H | |
| 043H | BASIC TIME SECTOR OF DISK 1 |
| 042H | |
| 041H | FIFO TRANSFER COUNTER |
| 057H | |

READING

| Address | Register |
|---|---|
| 057H | ITP \| ITE \| ITF \| ITTC \| REQE \| ACTE \| REQF \| ACTIF |
| 056H | FB FULL \| FB3 \| FB1 \| FB EMPTY \| CMD EMPTY \| CMD FULL \| STAT EMPTY \| STAT FULL |
| 055H | READING PORT IN DRAM (16 BITS) |
| 054H | |
| 053H | ATTENTION (MCA) REGISTER |
| 052H | BASIC CONTROL (MCA) REGISTER |
| 051H | COMMAND INTERFACE (16 BITS) |
| 050H | |
| 04FH | POS2 TO POS5 REGISTERS |
| 04EH | |
| 04DH | |
| 04CH | |
| 047H | SECTOR NUMBER OF DISK 2 |
| 046H | ACTE \| SENSE \| EGALE |
| 045H | DISK TRANSFER COUNTER |
| 044H | |
| 043H | SECTOR NUMBER OF DISK 1 |
| 042H | ACTF \| SENSF \| EGALF |
| 041H | FIFO TRANSFER COUNTER |
| 057H | |

FIG. 2E

COUPLER CIRCUIT AND ITS USE IN A CARD AND PROCESS

This application is a continuation of application Ser. No. 08/133,103, filed Sep. 28, 1994 now abandoned.

FIELD OF THE INVENTION

The present invention concerns a coupler circuit for directing data exchanges between a dynamic cache memory, a disk controller, and an MCA bus.

BACKGROUND OF THE INVENTION

Devices for storing and transferring information between a slow disk and a central processor are known. As in U.S. Pat. No. 4,533,995, these devices often resort to a cache memory, whose size has been minimized. U.S. Pat. No. 4,533,995 describes a device that makes it possible for a central processor to have direct access to a disk and access through a buffer cache memory. However, the device is created by a programmed microprocessor whose program manages addresses in the cache memory, whose size has been minimized.

SUMMARY OF THE INVENTION

The initial goal of the present invention is to provide an integrated coupler circuit that relieves a microprocessor of directing individual data exchanges between a cache memory, composed of a dynamic read/write memory, and a disk controller and an MCA bus. This goal is reached by the fact that the present invention coupler circuit has:

means for directing data exchanges between the disk controller and the dynamic cache memory after initialization by the microprocessor;

means for refreshing the dynamic cache memory;

means for directing data exchanges between the microprocessor and the dynamic cache memory; and means for directing data exchanges between the dynamic cache memory and a stack in the coupler circuit after initialization by the microprocessor.

According to a special feature of the present invention, the coupler circuit includes an arbiter circuit, a bidirectional data buffer organized as a 4-word FIFO stack and controlled by a control circuit, FIFO stack automation circuitry that gives a signal of the direction of operation of the stack on the basis of information supplied by a comparator register set, and a counter register set preloaded by the microprocessor with a starting address for the exchanges with the cache memory, the comparator register set being loaded with an ending address for exchanges with the cache memory and with a bit (ACTIF) indicating that the arbiter circuit may be enabled.

According to another special feature, the coupler circuit has a disk controller automation circuitry for controlling exchanges between the disk controller and the cache memory, the disk controller automation circuitry having a counter register set containing a starting address for exchanges with the cache memory, and a comparator register set containing an ending address for exchanges with the cache memory and a bit (ACTIE) indicating that the arbiter circuit may be enabled.

According to another special feature, the comparator register sets have bits (EGALF, EGALE) indicating whether the address values contained in the comparator register sets and the counter register sets are equal for the purpose of stopping the arbiter circuit.

According to another special feature, the control circuit supplies incrementation signals (INCF, INCE) to the counter register sets for incrementing the address values in the counter register sets.

According to another special feature, the disk controller automation circuitry has two preloading register sets that make it possible to preload the contents of the counter and comparator register sets to speed up exchanges between the disk controller and the cache memory.

According to another special feature, the coupler circuit has a mode register and a refresh clock whose time period can be set by the contents of a bit in the mode register.

According to another special feature, bits in the mode register are sent to a disk exchange request masking circuit to select the masking time of the exchange requests made by the microprocessor.

According to another special feature, the coupler circuit has sector counters incremented by a clock set on the basis of the characteristics of a disk, and index signals supplied by the disk controller indicative of a head passing a disk sector in order to reset the sector counter of a disk.

According to another special feature, the control circuit sets up sequencer signals (RAS0, RAS1, CAS0, CAS1, WEL, CSE1, CSE2) which are necessary for the cache memory to function.

According to another special feature, the coupler circuit has a circuit for controlling the parity of the data written into the cache memory and for generating an interrupt intended for the microprocessor if the parity read does not match the parity calculated by the parity circuit.

According to another special feature, the coupler circuit has a FIFO command stack, a FIFO status stack, and a basic status register to allow the central processor to consult the status of the stacks and to connect, on one hand, to the MCA bus, and, on the other hand, to the data bus of the microprocessor, the FIFO command stack being used by the central processor to transfer a command block to the coupler circuit and the FIFO status stack being used by the central processor to retrieve a status block from the coupler circuit.

According to another special feature, the coupler circuit has an attention register connected between the MCA bus and the data bus of the microprocessor to indicate to the microprocessor that the central processor wants to send a command.

According to another special feature, the coupler circuit has an interrupt status/type register to interrupt the central processor and inform it of the type of interrupt.

According to another special feature, the coupler circuit has an interrupt status/source register that tells the microprocessor the source that was responsible for initiating an interrupt to the microprocessor.

According to another special feature, the coupler circuit has an interrupt control register to allow the microprocessor to reset the information in the interrupt status/source register.

According to another special feature, a bit of the basic status register is used to indicate a data exchange request by generating a signal (DRQ) from the coupler circuit to the interface circuit.

Another goal is to propose an interface card having an MCA bus interface which allows a coupler circuit on the interface card to direct exchanges to and from a cache memory while it allows a microprocessor on the interface card to execute other routines.

This goal is reached by the fact that the interface card is between an MCA bus and a disk reader with a disk controller, and the microprocessor and the cache memory are characterized by the fact that the disk controller communicates via transceivers with two data buses, the first data bus communicating with the microprocessor and the coupler circuit, and the second data bus communicating with the cache memory and the coupler circuit. The microprocessor communicates by an address bus with a static read/write memory and a nonvolatile EPROM memory containing operating software for managing exchanges between the disk controller and the cache memory and between the cache memory and the MCA bus, and tables for managing the cache memory.

According to a special feature of the present invention, the coupler circuit communicates via a data bus with the MCA bus and an EPROM containing the basic input/output software (BIOS) program of the interface card.

According to another special feature, the coupler circuit receives address signals from the MCA bus via an address bus which is also connected to the EPROM, and the coupler circuit exchanges control signals with an interface circuit connected to the address bus of the MCA bus and exchanges control signals with the MCA bus.

According to another special feature, the microprocessor: manages the tables for controlling the cache memory; interprets the commands coming from the central processor; programs controllers in the coupler circuit; and controls the disk controller.

Another goal is to propose a process for managing exchanges from an interface card that make it possible to ensure that there is no conflict between a central processor and an element on the interface card.

This goal is reached by the fact that the process consists of: reading a basic status register wherein the sixth bit indicates the preparation of an interrupt and the fourth bit indicates the use of a coupler circuit; and verifying that these bits are set to "0" to authorize the central processor to write into an attention register to tell a microprocessor that the central processor wants to send a new command.

According to a special feature of the present invention, the process has a step of generating an interrupt signal (ATN) by the coupler circuit intended for the microprocessor.

According to another special feature, the process consists of: having the central processor set up a direct memory access (DMA) of the coupler circuit after having received a data transfer ready interrupt generated by a code formed by 4 bits in an interrupt status/type register written to by the microprocessor; and having the central processor set a bit in a basic control register to enable a DMA channel in the coupler circuit.

According to another special feature, the process has a step for setting a bit in the basic control register to enable the interrupts generated by the coupler circuit intended for the central processor.

Another goal is to propose an efficient process for directing data exchanges with a cache memory.

This goal is reached by the fact that the cache memory is divided into 4 channels and a nonvolatile EPROM memory contains an allocation table of the cache memory identifying a disk sector or a portion of a disk sector contained in each channel in a line of the allocation table, wherein the process consists of: addressing a line of the allocation table according to the low-weight bits of the address of a disk sector to be read; identifying whether the data from the disk sector to be read is already contained in the cache memory by comparing the high-weight bits of the address of the disk sector with the information contained in the allocation table; deciding whether to read data from the cache memory in the case of a match or to read data from the disk sector and enter it into the cache memory in the case of no match; deciding on the location in the cache memory where the data from the disk sector will be entered by using a least recently used table to define the high-weight bits of the address of the channel least recently used where the data will be entered; and modifying the contents of the least recently used table after the data is entered.

According to a special feature of the present invention, the process consists of: using an old table contained in the nonvolatile EPROM memory to match the contents of the least recently used table with the address of the channel least recently used and the number of the channel where the data will be entered; and using a combination of the contents of the least recently used table with the address of the channel least recently used with the number of the channel indicated by the old table to address a less utilized table in the nonvolatile EPROM memory whose contents at the addressed location immediately give the value to be entered in the least recently used table and indicate that the seniority of the channel where the data has been entered has been changed, as well as the seniority of the associated channels in the same line of the least recently used table.

According to another special feature, the process has, in the case of a match, a step for loading FIFO stack automation circuitry with parameters necessary to exchange data between the cache memory and a stack and for starting up an arbiter.

According to another special feature, the process has, in the case of no identification, prior to the above step, a step for loading disk controller automation circuitry with parameters necessary to exchange data between the cache memory and a disk controller and for starting up an arbiter.

Other characteristics and advantages of the invention will appear more clearly upon reading the following detailed description given with reference to the following enclosed drawings.

BRIEF DESCRIPTION OF THE DRAWINGS

FIG. 2C shows the contents of the registers in FIG. 2A.

FIG. 2D shows the contents of the registers in FIG. 2B.

FIG. 2E shows the addresses for selecting the different registers or elements in the coupler circuit.

DETAILED DESCRIPTION OF A PREFERRED EMBODIMENT

Figure 1:
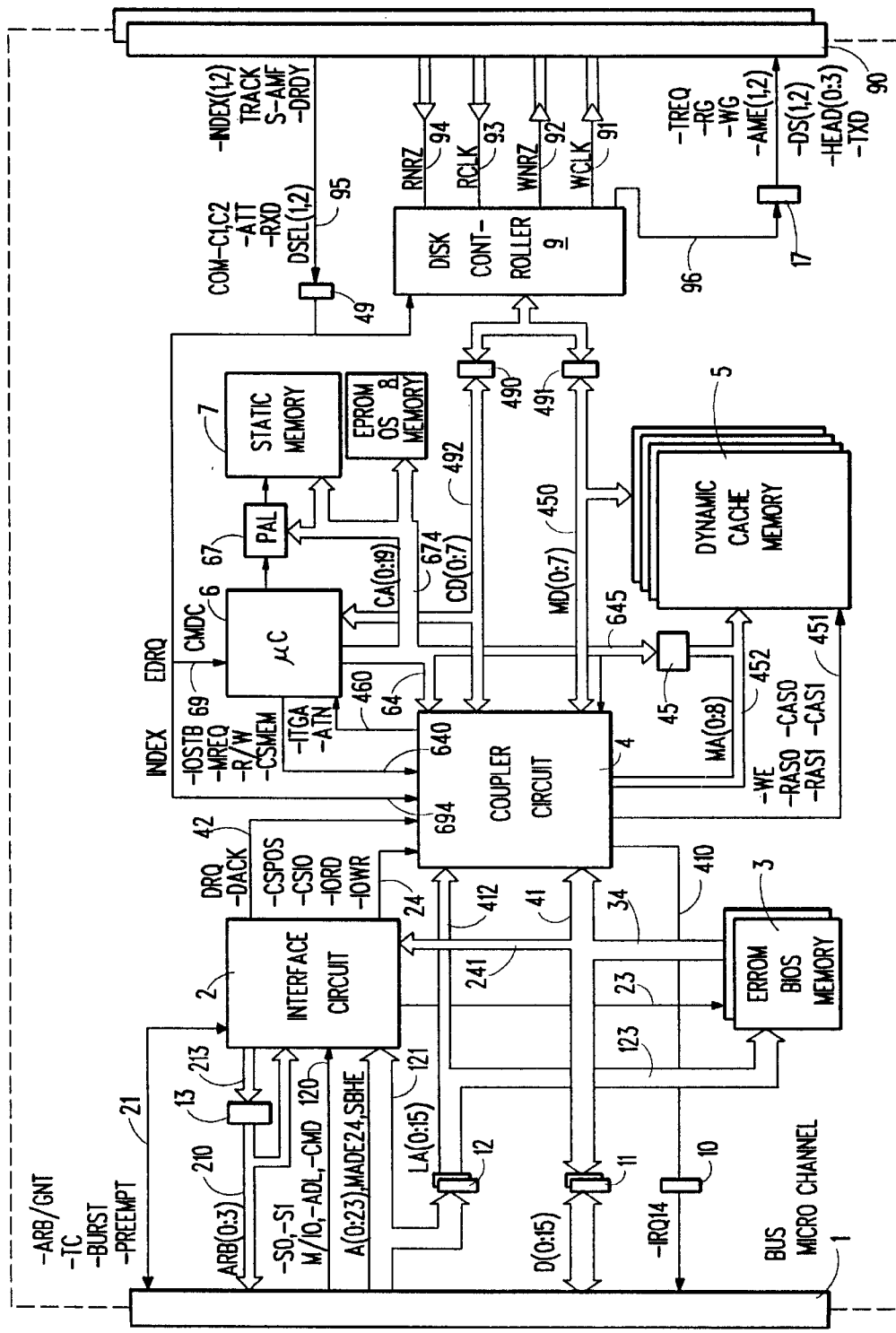
FIG. 1 is a schematic diagram of an interface card according to the present invention.

FIG. 1 shows a schematic diagram of an intelligent disk controller interface card according to the present invention. This card is connected to a Micro Channel Architecture (MCA) bus (1) via an interface circuit (2), which provides an interface between the MCA bus (1) and the other circuits of the card. For more details on the interface circuit (2), refer to U.S. Pat. No. 5,506,970 entitled "Multiapplication Interface Coupler Circuit for MCA Bus."

The interface circuit (2) controls access to an EPROM memory (3) which contains the basic input/output system (BIOS) software program of the disk controller interface card. A coupler circuit (4) forms the physical input-output interface between a central processor (not shown) and a microprocessor (6), as well as the interface between a cache memory (5), composed of a dynamic RAM, and a disk controller (9). The coupler circuit (4) is connected to the disk controller (9), which may be of a type sold by NEC under Reference No. 7262, by two separate data buses: MD(0:7) (450) connecting the disk controller (9), on one hand, to the cache memory (5) and, on the other hand, to the coupler circuit (4); and CD(0:7) (492) connecting the disk controller (9), on one hand, to the microprocessor (6) and, on the other hand, to the coupler circuit (4). The disk controller (9) communicates through transceivers (490, 491) with the two data buses (492, 450), wherein the first bus (492) communicates with the microprocessor (6) and the coupler circuit (4) and the second bus (450) communicates with the cache memory (5) and the coupler circuit (4). The coupler circuit (4) receives the data coming from the MCA bus (1) via a bus (41) interfaced with the MCA bus (1) via transceivers (11).

A bus (34) also makes it possible to connect the EPROM memory (3) containing the BIOS interface program to the bus (41), and a bus (241) connects the bus (41) to the interface circuit (2). The coupler circuit (4), via a bus (412), and the EPROM memory (3), via a bus (123), also receive addresses LA(0:15) coming through latches (12) from address bus A(0:23) (121), which connects the MCA bus (1) to the interface circuit (2). Signals MADE24 and SBHE are also on this bus (121). A control bus (120) makes it possible to receive control signals S0, S1, M/IO, ADL, and CMD from the MCA bus (1).

It should be noted that all of the signals on the MCA bus (1) are industry standard interface signals, each having signal names and timing and voltage characteristics which are known and available to anyone having skill in the art.

The interface circuit (2) transmits control signals ARB (0:3) by a bus (213) through a buffer (13) and receives them by a bus (210). A control bus (21) receives and transmits control signals TC, BURST, PREEMPT, and ARB/GNT. The interface circuit (2) decodes the control signals from the MCA bus (1) and generates control signals CSPOS, CSIO, IORD, and IOWR which are the transmitted to the coupler circuit (4) via a control bus (24). The interface circuit (2) also receives and transmits data request and data acknowledge (DACK) signals via control lines (42). The interface circuit (2) also transmits control signals to the EPROM memory (3) via control lines (23).

The coupler circuit (4) receives signals INDEX and EDRQ coming from the disk controller (9) by lines (694) and signals IOSTB, MREQ, R/W, and CSMEM from the microprocessor (6) by lines (640). The microprocessor (6) receives signals ITGA and ATN coming from the coupler circuit (4) by lines (460). The microprocessor (6) is connected by an address bus CA(0:19) (674) to a static memory (7), a programmable array logic (PAL) device (67), and an EPROM memory (8), which contains the operating software for the interface card. A portion (64) of the address bus CA(0:19) (674) connects the microprocessor (6) to the coupler circuit (4). The coupler circuit (4) sends control signals WEL, RAS0, RAS1, CAS0, and CAS1 through connection (451) to the cache memory (5).

The disk controller (9) receives signals COM-C1, COM-C2, ATT, RXD, TRACK, S-AMF, DSEL(1:2), INDEX(1:2), and DRDY through lines (95) and a buffer (49) from disk connector (90), which is connected to at least one disk (not shown). Similarly, disk controller (9) receives through line (94) read data signal RNRZ and through line (93) read clock signal RCLK. Conversely, disk controller (9) transmits through line (92) write data signal WNRZ, through line (91) write clock signal WCLK, and through line (96) and a buffer (17) signals TREQ, RG, WG, AME(1:2), DS(1:2), HEAD (0:3), and TXD.

For the mode of operation of the interface circuit (2) and the significance of the signals received and transmitted by it, refer to U.S. Pat. No. 5,506,970.

Figure 2A:
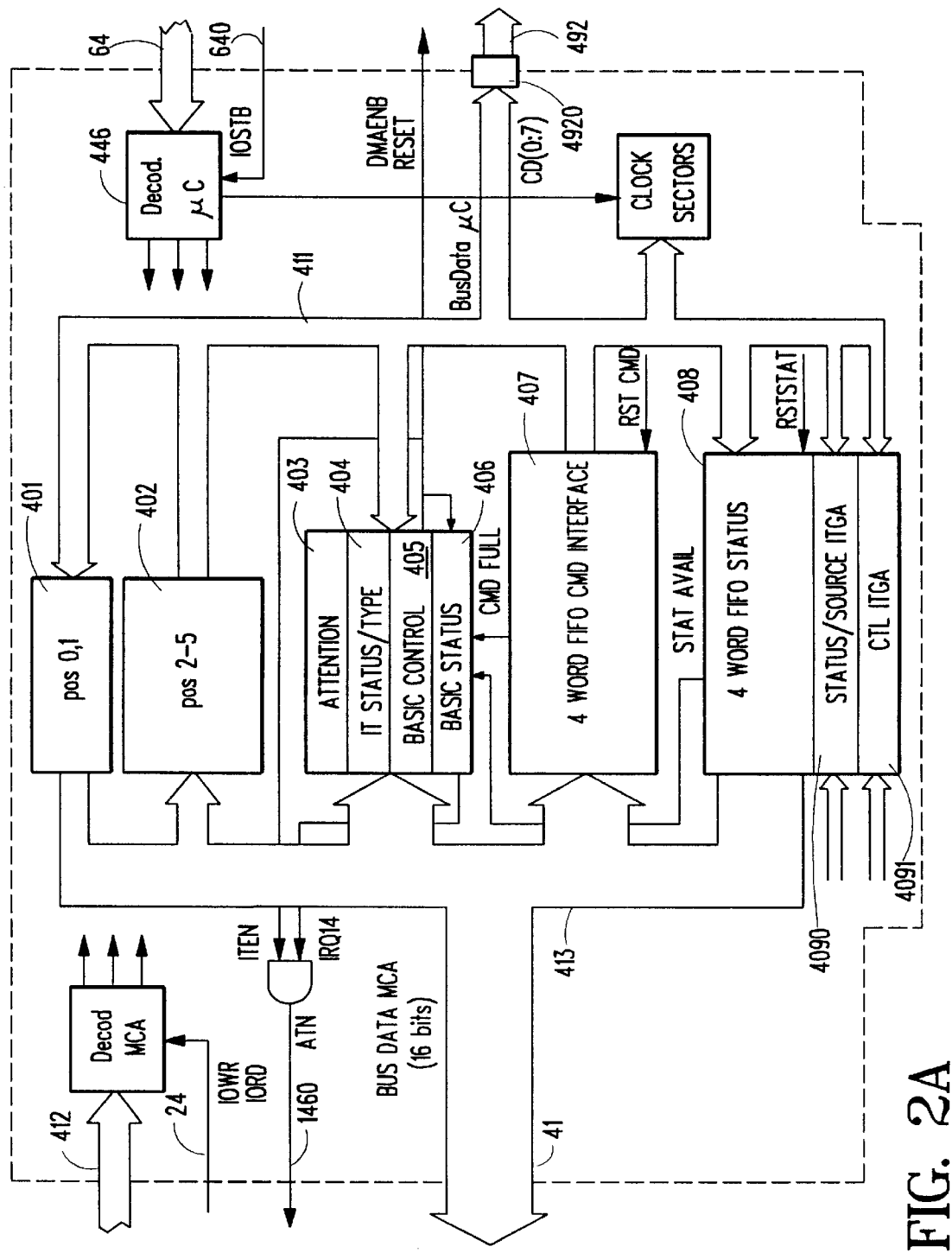
FIG. 2A shows a first part of the coupler circuit according to the present invention.
Figure 2B:
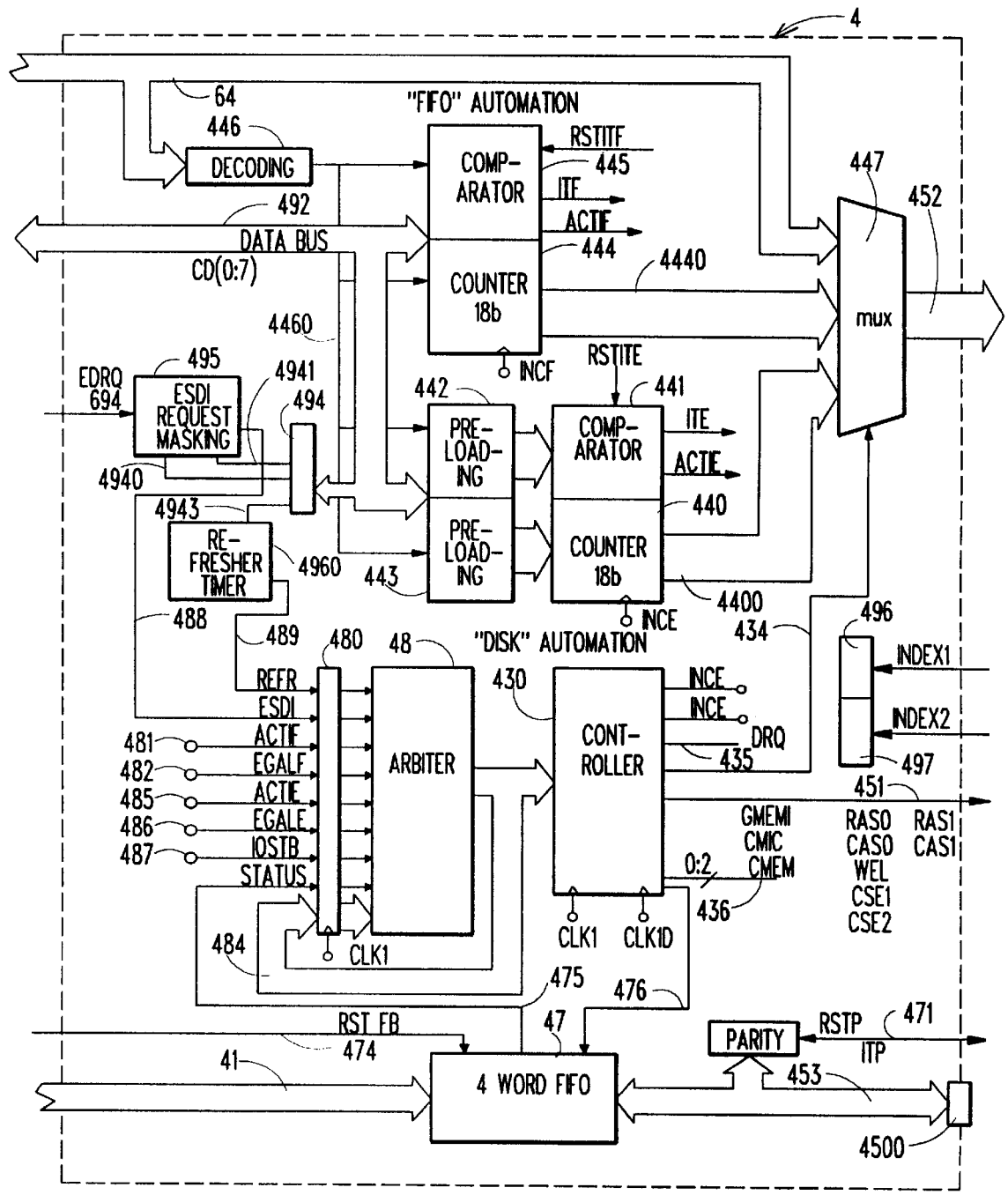
FIG. 2B shows a second part of the coupler circuit according to the present invention.

FIG. 2A shows the logic diagram of the input/output interface of the coupler circuit (4), while FIG. 2B shows the logic diagram of the circuits that perform the memory functions of the coupler circuit (4). FIG. 2A shows the part of the coupler circuit (4) that provides an input/output interface between the MCA bus (1) and the microprocessor (6). This part of the coupler circuit (4) serves as the input/output interface between the central processor and the microprocessor (6).

FIG. 2B shows the part of the coupler circuit (4) that coordinates all access to the cache memory (5). This part of the coupler circuit (4) directs data exchanges over the data bus (492), the data bus (450), and the data bus (41).

The part of the coupler circuit (4) shown in FIG. 2A has two registers (401), called POS 0 and POS 1 for programmable option selection 0 and 1, respectively, located at addresses 100h and 101h, respectively, that serve as identification registers for the interface card. These two registers (401) are connected by a first internal bus (413) to the data bus (41) on the one hand, and by a second internal bus (411) and an internal multiplexing circuit (4920) to the data bus (492) on the other hand. Also connected to the same buses are four hardware programming registers (402), called POS 2 to POS 5, at addresses 102h to 105h, respectively. Note that registers POS 2 to 5 (402) of the coupler circuit (4) are a copy of the contents of corresponding registers of the interface circuit (2) and that the microprocessor (6) may access these registers.

Registers POS 2 to POS 5 (402) contain the information shown in FIG. 2C. Register POS 2, located at address 102h, indicates the following information in bits 0 to 7:

Bit 0: ENCD. Enable bit for the interface card, indicating the enabling of the interface card according to its value.

Bits 1–2: SIZE. Indicates the size of the input/output field of the coupler circuit (4) according to the table below:

| | |
|---|---|
| 00 | no input/output |
| 01 | 8 bytes |
| 10 | 16 bytes |
| 11 | 32 bytes |

Bits 3–5: SEGMENT. Indicates the number of the segment of the BIOS EPROM memory (3) used by the following code:

| | |
|---|---|
| 000 | C000 to C3FFF |
| 001 | C400 to C7FFF |
| ... | ... |
| 111 | DC000 to DFFFF |

Bits 6-7: SIZE. Indicates the size of the BIOS EPROM memory (3) in which the BIOS segment is installed according to the code below:

| | |
|---|---|
| 00 | inhibition of ROM |
| 01 | 16 Kbytes |
| 10 | 32 Kbytes |
| 11 | 64 Kbytes |

Register POS 3, located at address 103h, indicates the following information in bits 0 to 7:

Bits 0–3: ARB(0:3). Indicates the level of arbitration of the DMA channel.

Bit 4: FAIR. Indicates the enabling of a mode "EQUITY" (meaning fairness) in the arbitration of the DMA channel as a burst to prevent the DMA channel from monopolizing the system.

Bit 5: EARB. Indicates the enabling of the arbitration of the DMA channel (authorizes participation in MCA arbitration).

Bits 6–7: BURST. Allows programming of the size of the BURST mode, for a maximum length of the PREEMPT signal, since it is known that the BURST mode can be interrupted by the PREEMPT signal.

| | |
|---|---|
| 00 | simple access (no BURST) |
| 01 | 8 cycles |
| 10 | 16 cycles |
| 11 | 32 cycles |

Note: The BURST mode only operates in a minimum 300 ns synchronous extended cycle.

Register POS 4, located at the address 104h, indicates the following information in bits 0 to 7:

Bits 0–7: A(3:10). Bits 3 to 10 of the basic I/O address.

Register POS 5, located at the address 105h, indicates the following information in bits 0 to 7:

Bits 0–4: A(11:15). Bits 11 to 15 of the basic I/O address.

Bit 5: RDY. Management of the READY signal: 200 ns or ≧300 ns.

Bits 6–7: Reserved.

The circuit in FIG. 2A is also made up of the registers ATTENTION (403), INTERRUPT STATUS/TYPE (404), BASIC CONTROL (405), BASIC STATUS (406), a four-word FIFO COMMAND stack (407), and a four-word FIFO STATUS stack (408), which are accessible, on the one hand, via the bus (413) and, on the other hand, via the internal bus (411). The contents of these different registers are shown in FIG. 2C.

The ATTENTION register (403) is used to indicate to the microprocessor (6) that the central processor wants to send a new command. Writing to the ATTENTION register (403) immediately generates the interrupt signal ATN to the microprocessor (6). When the central processor performs multitasking, this requires a strict sending protocol for the commands by the central processor and response from the coupler circuit (4). The central processor cannot write to the ATTENTION register (403) unless the BUSY and IRQ PEND bits of the BASIC STATUS register (406) described below are set to "0". If one of those two bits is set to "1", this indicates that the coupler circuit (4) is in a critical phase during which it cannot receive a new command.

The bits in the ATTENTION register (403) are defined as follows:

Bits 7–5:
 000 Attention concerning disk 0.
 001 Attention concerning disk 1.
 01x Reserved.
 10x Reserved.
 111 Attention concerning the coupler circuit (4).

Bit 4: Reserved. Always set to "110".

Bits 3–0:
 0001 Command Request.
 0010 End of Interrupt.
 0011 Abort Command.
 0100 Reset Command.

The state of the bits in the ATTENTION register (403) has no effect on the internal workings of the coupler circuit (4). However, when writing to the ATTENTION register (403), the coupler circuit (4) transmits an interrupt to the microprocessor (6).

The BASIC CONTROL register (405) allows the central processor to control certain basic functions of the coupler circuit (4). The bits in the BASIC CONTROL register (405) are defined as follows:

Bit 7: RESET. When set to 1, the hardware is reset and the microprocessor (6) performs its start-up sequence.

Bits 6–2: Reserved. Always set to "0".

Bit 1: DMA ENB. Enable for the DMA of the coupler circuit (4). After the central processor has set up a DMA of the coupler circuit (4) and received the interrupt "Data Transfer Ready," the central processor should set this bit.

Bit 0: ITEN. Enable for the interrupt IRQ14. If set to "0", the coupler circuit (4) will not be able to generate an interrupt to the central processor.

The state of bits 7, 1, and 0 in the BASIC CONTROL register (405) correspond to functions which are performed by the coupler circuit (4). The BASIC CONTROL register (405) is completely readable by the microprocessor (6), including bits 2 to 6.

The BASIC STATUS register (406) allows the central processor to consult the status of the FIFO COMMAND stack (407) and the FIFO STATUS stack (408), as well as other hardware in the coupler circuit (4). The bits in the BASIC STATUS register (406) are defined as follows:

Bit 7: DMA ENB. Enable for the DMA channel in the coupler circuit (4). This bit reflects the status of bit 1 of the BASIC CONTROL register (405).

Bit 6: IRQ PEND. Indicates the preparation of an interrupt. The coupler circuit (4) sets this bit to "1" when it is in a critical phase in which it is about to write to the INTERRUPT STATUS/TYPE register (404) and generate an interrupt. This bit is reset to "0" at the interrupt.

Bit 5: CIP. Command in Progress. This bit is set to "1" as soon as the coupler circuit (4) reads a command block, and it is reset to "0" after the central processor has sent the code "END OF INTERRUPT" to the ATTENTION register (403).

Bit 4: BUSY. This bit is set to "1" by a write to the ATTENTION register (403) by the microprocessor (6), and it is reset to "0" by the microprocessor (6) in the following cases: After the transfer of a command block; After a reset; After a RESET command in the ATTENTION register (403); After an ABORT command in the ATTENTION register (403).

This bit is always set to "1", during the transfer of a command block or a status block.

Bit 3: STAT AVAIL. FIFO STATUS stack (408) available. This bit is managed by the hardware in the coupler circuit (4). It indicates the status of the FIFO STATUS stack (408) in the coupler circuit (4). When this bit is set to "1", the central processor can read a word from the FIFO STATUS stack (408).

Bit 2: CMD FULL. FIFO COMMAND stack (407) full. This bit is managed by the hardware in the coupler circuit (4). It indicates the status of the FIFO COMMAND stack (407) in the coupler circuit (4). When this bit is set to "0", the central processor can write a word to the FIFO COMMAND stack (407).

Bit 1: TRANSF REQ. Data transfer request. This bit reflects the status of the signal DRQ that the coupler circuit (4) sends to the interface circuit (2).

Bit 0: IRQ ON. Interrupt. This bit is set to "1" when the microprocessor (6) writes to the INTERRUPT STATUS/TYPE register (404). If the interrupt is enabled, the hardware interrupt signal IRQ14 is equal to the value of this bit.

The INTERRUPT STATUS/TYPE register (404) is used in the coupler circuit (4) to interrupt the central processor and inform it of the type of interrupt. Upon writing by the microprocessor (6) to this register (404), the interrupt signal IRQ14 occurs. The structure of this register (404), which is like the structure of the ATTENTION register (403), is as follows:

Bits 7–5:
  000 Interrupt concerning a disk 0 command.
  001 Interrupt concerning a disk 1 command.
  01x Reserved.
  10x Reserved.
  111 Interrupt concerning a coupler circuit (4) command.

Bit 4: Reserved. Always set to "0".

Bits 3–0:
  0000 Reserved.
  0001 Command successfully executed.
  0010 Reserved.
  0011 Command executed by using ECC.
  0100 Reserved.
  0101 Command executed by making retries.
  0110 Command partially made. Status.
  0111 Command made by using ECC and retries.
  1000 Command executed with warning.
  1001 Abort completed.
  1010 Reset completed.
  1011 Data transfer ready. No status.
  1100 Command carried out with error.
  1101 DMA error or parity. Status available. It is advised to start the whole command over.
  1110 Error in the command block.
  1111 Error in ATTENTION register (403).

The state of the bits in the INTERRUPT STATUS/TYPE register (404) has no effect on the internal workings of the coupler circuit (4) other than to generate the interrupt signal IRQ14.

The 16-bit FIFO COMMAND stack (407) is used by the central processor to transfer a command block to the coupler circuit (4). A command block is generally comprised of 2 or 4 words. The stack (407) takes the form of a 4-word FIFO stack in the coupler circuit (4) between the MCA bus (1) and the microprocessor (6). Before writing a word to the FIFO COMMAND stack (407), the central processor must make sure that it is not full by consulting the BASIC STATUS register (406). Thanks to the depth of the FIFO stack, the FIFO COMMAND stack (407) will almost always appear free to the central processor.

The 16-bit FIFO STATUS stack (408) is used by the central processor to retrieve a status block from the coupler circuit (4). A status block is generally comprised of 2 or 4 words. The stack (408) takes the form of a 4-word FIFO stack in the coupler circuit (4) between the MCA bus (1) and the microprocessor (6). Before reading a word from the FIFO STATUS stack (408), the central processor must make sure that it is not empty by consulting the BASIC STATUS register (406).

The interrupt signal IRQ14 allows the coupler circuit (4) to tell the central processor that an action has just ended or that an anomaly has taken place. The information concerning the interrupt is located in the INTERRUPT STATUS/TYPE register (404). The central processor can invalidate the interrupt by setting to "0" the bit ITEN in the BASIC CONTROL register (405). The microprocessor (6) initiates the sending of the interrupt when it writes to the INTERRUPT STATUS/TYPE register (404). The central processor can verify that the interrupt indeed comes from the coupler circuit (4) by reading bit 0 from the BASIC STATUS register (406). The interrupt is removed when the central processor reads the INTERRUPT STATUS/TYPE register (404). The microprocessor (6) can, in exceptional cases, reset the interrupt by setting to "0" bit 0 of the BASIC STATUS register (406). After a reset command, the interrupt is not active.

Physically, the interrupt signal IRQ14 is produced in the coupler circuit (4). It is sent to the MCA bus (1) on line (410) via an open collector buffer (10).

FIG. 2B shows the memory part of the coupler circuit (4) which makes it possible to use the information stored and cached in the cache memory (5), and to transfer data either to the disk controller (9) or to the MCA bus (1). This part of the coupler circuit (4) has a control circuit (430) for the cache memory (5) connected by a bus (483) to an arbiter (48). The control circuit (430) is connected by a connection (476) to a bidirectional data buffer organized as a 4-word FIFO stack (47), which is itself connected between, on the one hand, the cache memory (5) and its bus (450) by an internal bus (453) and an internal multiplexing circuit (4500) and, on the other hand, the MCA bus (1) by the bus (41). The internal bus (453) also communicates with a parity determination circuit (470) which transmits or receives, by a connection (471), a parity bit coming from a parity memory contained within the cache memory (5). The FIFO stack (47) is connected, by a connection (475), to a buffer register (480) which stores signals coming from different locations in the coupler circuit (4) and which are destined for the arbiter (48). The bus (483) is also connected, by a shunt (484), to the input of the buffer register (480). The FIFO stack (47) receives, via a connection (474), a signal RST FB coming from a CTL ITGA register (4091, FIG. 2A). The control circuit (430) for the cache memory (5) transmits, by a connection (451), the signals RAS0, RAS1, CAS0, CAS1, WEL, CSE1, and CSE2, which are necessary for the functioning of the different cycles of the cache memory (5). The control circuit (430) controls the timings of the cache memory (5) and, via connection lines (434), the multiplexing of addresses carried out by a multiplexer (447), whose output is connected to an address bus (452).

The address multiplexer (447) receives on one input the addresses coming from the address bus (64), which are also sent to a decoding circuit (446). The decoding circuit (446) controls, through connection lines (4460), automatic FIFO transfers between the FIFO stack (47) and the cache memory (5) through a comparator register set (445) and an 18-bit counter register set (444). The counter register set (444) is connected by a bus (4440) to the address multiplexer (447). Similarly, the decoding circuit (446) controls automatic disk controller transfers between the disk controller (9) and the cache memory (5). Two preloader register sets (442, 443) are connected, on the one hand, to the data bus (492) and connected, on the other hand, to a comparator register set (441) and an 18-bit counter register set (440). The output of the counter register set (440) is sent by a bus (4400) to the address multiplexer (447).

The contents of the counter register set (444) are shown in FIG. 2D, and this counter register set (444) initially contains the starting address for an automatic FIFO transfer on 18 bits from A1 to A18. The contents of the comparator register set (445) are shown in FIG. 2D, and this comparator register set (445) is loaded with the ending address for an automatic FIFO transfer on 18 bits from A1 to A18.

The sixth bit of the comparator register set register located at address 04Ah contains the information SENSF which indicates the direction of the automatic FIFO transfer.

The seventh bit of the comparator register set register located at address 04Ah contains the information ACTIF which, when set to "1", indicates that the arbiter (48) may consider automatic FIFO transfer requests. Conversely, when the ACTIF bit is set to "0", the arbiter (48) may not consider automatic FIFO transfer requests. A signal indicating the state of the ACTIF bit is transmitted, by a connection (481), to the buffer register (480). Accordingly, the comparator register set register located at address 04Ah must be written into last since it initiates transfer operations.

The contents of the counter register set (444) are accessible during an automatic FIFO transfer as indicated by the information (4441) shown in FIG. 2D. The bits Al to A18 form the running address of the counter register set (444), the sixth and seventh bits of the counter register set register located at address 042h represent the information SENSF and ACTIF, and the fifth bit of the counter register set register located at address 042h represents the information EGALF which is set to "1" if the value of the counter register set (444) is equal to the value of the ending address contained in the comparator register set (445), and in such a case generates a signal ITF which is sent to a STATUS/SOURCE ITGA register (4090, FIG. 2A). The comparator register set (445) also receives a reset-to-zero signal RST ITF. This signal RST ITF is supplied by the CTL ITGA register (4091, FIG. 2A). A signal indicating the state of the EGALF bit is transmitted, by a connection (482), to the buffer register (480).

Similarly, the contents of the counter register set (440) and of the comparator register set (441) are made up of automatic disk controller transfer starting and ending addresses, respectively. The comparator register set register located at the address 04Eh also contains the information ACTIE and SENSE, which have a meaning similar to the information ACTIF and SENSF but applied to an automatic disk controller transfer between the disk controller (9) and the cache memory (5). The preloader register sets (442, 443) make it possible to load 5 of the 6 bytes comprising the information to be entered in the counter register set (440) and the comparator register set (441) without disturbing ongoing transfers.

The comparator register set register located at the address 04Eh is the only one of the six registers not to have preloading. It must be written to only if there are no ongoing transfers. When the microprocessor (6) is writing to this particular comparator register set register, the contents of the preloader register sets (442, 443) are transferred to the other registers in the counter register set (440) and the comparator register set (441). The seventh bit of the comparator register set register located at address 04Eh contains the information ACTIE which, when set to "1", indicates that the arbiter (48) may consider automatic disk controller transfer requests. Conversely, when the ACTIE bit is set to "0", the arbiter (48) may not consider automatic disk controller transfer requests. A signal indicating the state of the ACTIE bit is transmitted, by a connection (485), to the buffer register (480). Accordingly, the comparator register set register located at address 04Eh must be written into last since it initiates transfer operations.

The contents of the counter register set (440) are accessible during an automatic disk controller transfer as indicated by the information (4411) shown in FIG. 2D. The bits A0 to A18 form the running address of the counter register set (440), the sixth and seventh bits of the counter register set register located at address 046h represent the information ACTIE and SENSE, and the fifth bit of the counter register set register located at address 046h represents the information EGALE which is set to "1" if the value of the counter register set (440) is equal to the value of the ending address contained in the comparator register set (441), and in such a case generates a signal ITE which is sent to the STATUS/SOURCE ITGA register (4090, FIG. 2A). The comparator register set (441) also receives a reset-to-zero signal RST ITE. This signal RST ITE is supplied by the CTL ITGA register (4091, FIG. 2A). A signal indicating the state of the EGALE bit is transmitted, by a connection (486), to the buffer register (480).

The part of the coupler circuit (4) shown in FIG. 2B receives disk exchange requests by the signal EDRQ via line (694). This signal EDRQ is sent to a request-masking circuit (495), which receives on two other inputs signals (4940, 4941) transmitted from a MODE register (494) loaded by the microprocessor (6) via the bus (492). The state of bits 0 and 1 in the MODE register (494) indicate the masking time for a disk exchange request which is coded according to the following table:

00=40 ns
01=80 ns
10=120 ns
11=160 ns

On the basis of the code present on the signal lines (4940, 4941), the signal EDRQ sent by the disk controller (9) is masked during the programmed time, so that if it becomes active during the programmed time, the arbiter (48) will be prevented from taking it into account and immediately starting another disk controller transfer. Bits 2 and 5 of the MODE register (494) are unused. The state of bit 3 in the MODE register (494) indicates which one of two possible refresh periods have been selected: 10.24 microseconds for a bit value of "0" and 12.80 microseconds for a bit value of "1". A signal indicating the state of bit 3 is sent by line (4943) to a refresh clock circuit (4960) whose output supplies a refresh request signal REFR to the buffer register (480) via line (489).

The state of bit 4 in the MODE register (494) indicates the selection of a test mode for the coupler circuit (4). At start-up and in use, bit 4 is set to zero. The state of bit 6 in the MODE register (494) indicates that the FIFO COMMAND stack (407) has been reset to zero. A signal RST CMD indicating the state of bit 6 is sent to the FIFO COMMAND stack (407) (see FIG. 2A). Bit 6 is active only when writing to the MODE register (494). Likewise, the state of bit 7 in the MODE register (494) indicates that the FIFO STATUS stack (408) has been reset to zero. A signal RST STAT indicating the state of bit 7 is sent to the FIFO STATUS stack (408) (see FIG. 2A). Bit 7 is active when it is set to "1".

The control circuit (430), which receives a first clock signal CLK1 and a second clock signal CLK1D, shifted by 30 ns, generates multiplexer command signals (434), dynamic read/write cache memory sequencing signals (436), an incrementation signal INCF sent to counter register set (444), and an incrementation signal INCE sent to counter register set (440). The INCF and INCE signals serve to increment the counter register sets (444, 440), respectively.

The coupler circuit (4) comprises the STATUS/SOURCE ITGA register (4090) and the CTL ITGA register (4091) (see FIG. 2A). In the STATUS/SOURCE ITGA register (4090), the four high-order bits indicate the source of the interrupt signal ITGA to the microprocessor (6). The state of bit 7 in the STATUS/SOURCE ITGA register (4090) represents the state of a signal ITP, which symbolizes a parity interrupt, and indicates that a parity error was detected by the parity determination circuit (470) and sent by line (471) to the STATUS/SOURCE ITGA register (4090) during a reading of the cache memory (5). The state of bit 6 in the STATUS/SOURCE ITGA register (4090) represents the state of a signal ITE and indicates that a disk controller interrupt has occurred, meaning that the disk controller automation circuitry has stopped, the transfer having terminated. The state of bit 5 in the STATUS/SOURCE ITGA register (4090) represents the state of a signal ITF and indicates that a FIFO stack interrupt has occurred, meaning that the FIFO stack automation circuitry has stopped, the transfer having terminated. The state of bit 4 in the STATUS/SOURCE ITGA register (4090) represents the state of a signal ITTC and indicates that an interrupt due to a signal TC from the MCA bus (1) has occurred, which indicates a terminated MCA transfer. The state of bit 3 in the STATUS/SOURCE ITGA register (4090) represents the state of an REQE signal and indicates a disk controller exchange request. If the signal REQE is set to "1" and the disk controller automation circuitry is stopped, the disk controller automation circuitry must be reactivated. The state of bit 2 in the STATUS/SOURCE ITGA register (4090) represents the state of the signal ACTIE and indicates activity in the disk controller automation circuitry. The disk controller automation circuitry is active when bit 2 is set to "1". The state of bit 1 in the STATUS/SOURCE ITGA register (4090) represents the state of an REQF signal and indicates a FIFO stack exchange request. If the REQF signal is set to "1" and the FIFO stack automation circuitry is stopped, the FIFO stack automation circuitry must be reactivated. The state of bit 0 in the STATUS/SOURCE ITGA register (4090) represents the state of the signal ACTIF and indicates activity in the FIFO stack automation circuitry. The FIFO stack automation circuitry is active when bit 0 is set to "1".

The CTL ITGA register (4091) gives the microprocessor (6) control to reset one or more of the sources of the interrupt signal ITGA to the microprocessor (6), and to enable or disable them. The state of bit 7 in the CTL ITGA register (4091) represents the state of the RST FB signal on line (474) which serves to reset the FIFO stack (47) to zero. The state of bit 6 in the CTL ITGA register (4091) represents the state of the RST P signal on line (471) which serves to reset the parity determination circuit (470) to zero. If bit 6 is set to "1" and remains at that value, the parity determination circuit (470) will be disabled. The state of bit 5 in the CTL ITGA register (4091) represents the state of a signal EN ITE which enables the ITE interrupt of the disk controller automation circuitry. If bit (5) is set to "1", the ITE interrupt of the disk controller automation circuitry is enabled. The state of bit 4 in the CTL ITGA register (4091) represents the state of a signal RST ITE which serves to reset the ITE interrupt of the disk controller automation circuitry. When the microprocessor (6) sets bit 4 to "1", the ITE interrupt of the disk controller automation circuitry is overridden. The state of bit 3 in the CTL ITGA register (4091) represents the state of a signal EN ITF which enables the ITF interrupt of the FIFO stack automation circuitry. If bit 3 is set to "1", the ITF interrupt of the FIFO stack automation circuitry is enabled. The state of bit 2 in the CTL ITGA register (4091) represents the state of the RST ITF signal which serves to reset the ITF interrupt of the FIFO stack automation circuitry. When the microprocessor (6) sets bit 2 to "1", the ITF interrupt of the FIFO stack automation circuitry is overridden. The state of bit 1 in the CTL ITGA register (4091) represents the state of a signal EN ITTC which enables the interrupt TC. If bit 1 is set to "1", the ITE interrupt of the disk controller automation circuitry is enabled. The state of bit 0 in the CTL ITGA register (4091) represents the state of a signal RST ITTC which serves to reset the interrupt TC. When the microprocessor (6) sets bit 0 to "1", the interrupt due to the signal TC of the MCA bus (1) is overridden.

The STATUS/SOURCE ITGA and CTL ITGA registers (4090, 4091) allow the multiplexing of the various interrupts that generate the interrupt signal ITGA to the microprocessor (6) to be managed. The interrupt signal ITGA can be activated when the disk controller automation circuitry has stopped, when the FIFO stack automation circuitry has stopped, when the MCA bus (1) indicates by its signal TC that a DMA transfer is completed, and when a parity error has been detected. The microprocessor (6) also receives the interrupt signal ATN, generated when the central processor writes in the ATTENTION register (403). Finally, the microprocessor (6) receives an interrupt signal CMDC on line (69) after the execution of a command.

The coupler circuit (4) also comprises disk sector counters (496, 497) for providing disk sector numbers which indicate the location of a head on a disk. These disk sector counters (496, 497) are reset by signals INDEX 1 and INDEX 2 delivered, respectively, by disk 1 and disk 2 readers. The incrementation time of each disk sector counter (496, 497) is determined by the microprocessor (6) according to the characteristics of each disk.

FIG. 2E provides an addressing map for the various registers of the coupler circuit (4) when being accessed by writing or reading.

Figure 2F:
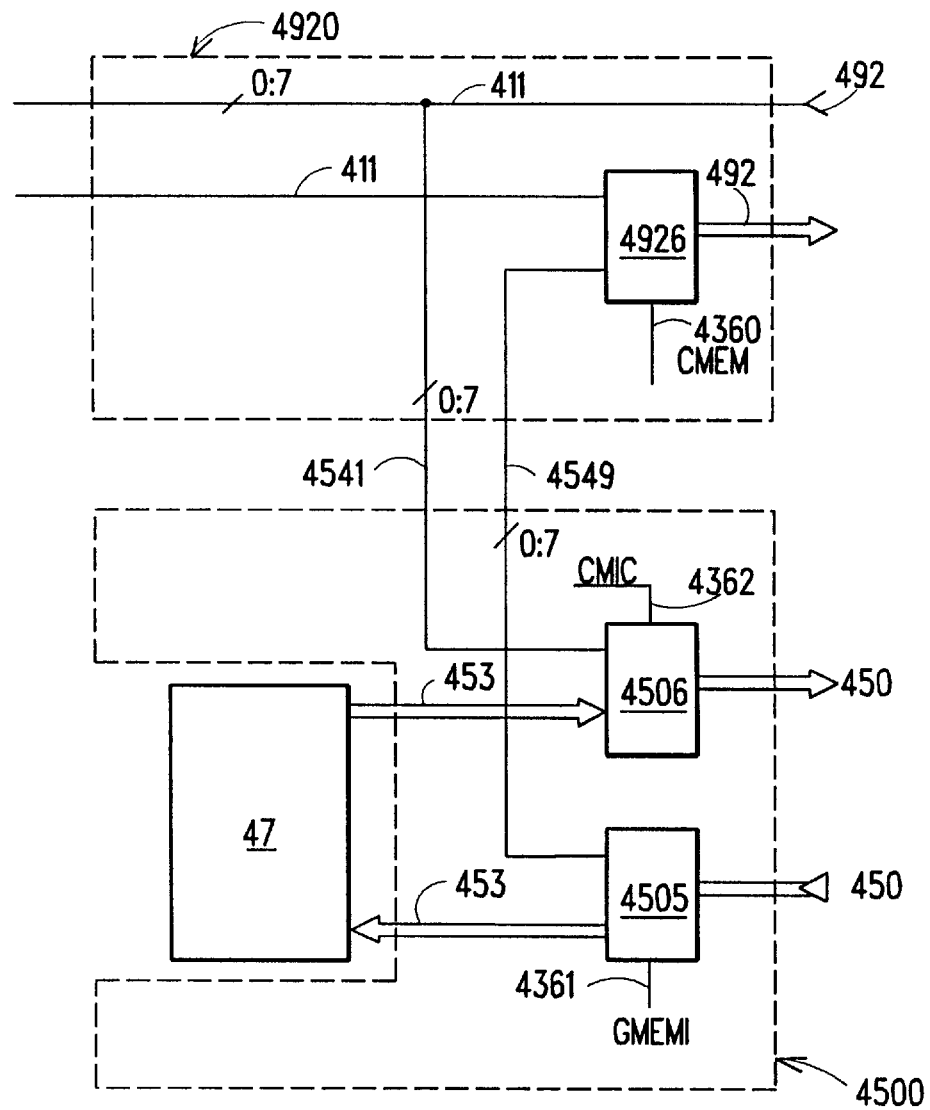
FIG. 2F shows a diagram of the connections in the coupler circuit that make possible communications between the different buses of the interface card.

FIG. 2F shows the details of the internal multiplexing circuits (4500, 4920) in the coupler circuit (4) which allow communication between the various data buses (492, 450, 41) of the interface card. A first multiplexer (4505) links the cache memory (5) and the bus (450) either to the 4 word FIFO stack (47) by the bus (453), or to a second multiplexer (4926) by an internal bus (4549). The second multiplexer (4926) operates to send to the microprocessor (6) or to the disk controller (9) data from the cache memory (5) via the first multiplexer (4505) and the internal bus (4549), or data from the registers (401 to 409) of the coupler circuit (4) via the internal bus (411). The second multiplexer (4926) is commanded by a signal CMEM via a connection line (4360) from the output (436) of the control circuit (430). The first multiplexer (4505) is commanded by a signal GMEMI via a connection line (4361) from the output (436) of the control circuit (430). A third multiplexer (4506) commanded by a signal CMIC via a connection line (4362) from the output (436) of the control circuit (430) allows data to be sent to bus (450) from the 4 word FIFO stack (47) via internal bus (453), from registers (401 to 409) via the internal bus (411) and an internal bus (4541), or from the microprocessor (6) or the disk controller (9) via the data bus (492), the internal bus (411), and the internal bus (4541).

The coupler circuit (4) permits various types of accesses with timings which are indicated in FIGS. 3A to 3G. These timings are obtained with a 25 Mhz clock represented by the signal CLK1 and the signal CLK1D, which is shifted by 30 ns. Each cycle is divided into 10 ns increments. FIG. 3H represents the orders of priority of the various sequences of access or exchanges corresponding to the diagrams of FIGS. 3A to 3G and, in each sequence, the concatenation of the various cycles.

Figure 3A:
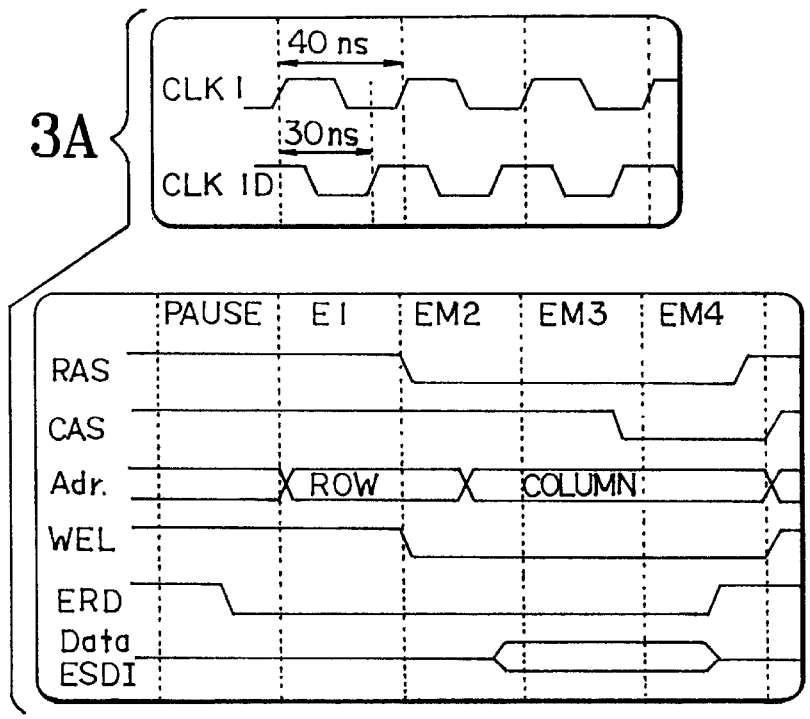
FIGS. 3A to 3G show the different sequences for exchanging signals between the coupler circuit and the other elements of the interface card.

FIG. 3A is a timing diagram illustrating accesses from the disk controller (9) to the cache memory (5) and the signals generated by the arbiter (48) for managing that exchange. The disk controller (9) emits the signal EDRQ during a pause cycle on line (694). The arbiter (48) receives this signal, after being transformed into a signal ESDI on line (488), and informs the control circuit (430) of its occurrence. Then the control circuit (430), after the address of the cache memory (5) has been furnished during cycle E1, generates the signals RAS and WEL during cycle EM2 and CAS during cycle EM3 that are necessary for entry of data into the cache memory (5), and a read signal ERD to order a transfer from the disk controller (9) to the cache memory (5). In the case of writing to the disk controller (9), a write signal EWR will be generated. Accesses from the disk controller (9) to the cache memory (5) are, as may be seen in FIG. 3H, of the highest priority. In fact, as shown in FIG. 3H, the sequences of the various timing diagrams have been represented and each cycle (for example, E1 to EM4) of a sequence is shown by a bubble representing 40 ns with each access sequence being classified from the highest to the lowest in descending priority order. So, when a request from the disk controller (9) is transmitted, a transfer of a single eight-bit byte is made and, during a programmable time of 40 to 160 ns, the disk controller request to the arbiter (48) is masked, aided by the MODE register (494) of the coupler circuit (4). The transfer addresses are earlier loaded into the preloader register sets (442, 443), and hence the counter and comparator registers sets (440, 441), by the microprocessor (6).

Figure 3B:
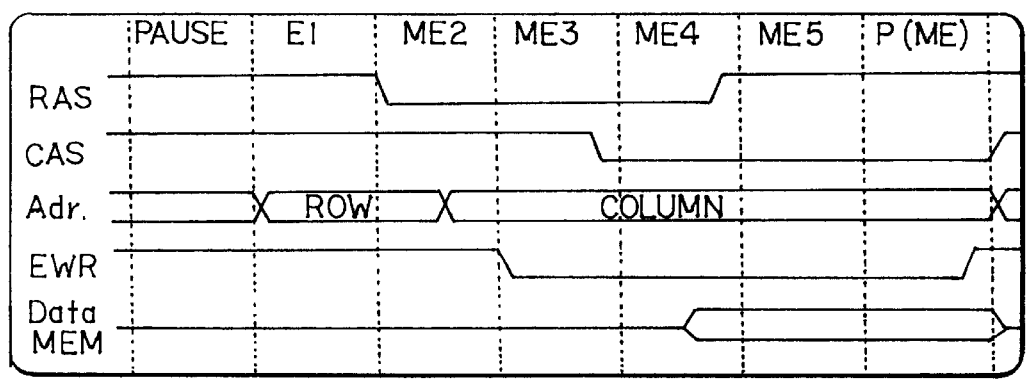

FIG. 3B is a timing diagram illustrating accesses from the cache memory (5) to the disk controller (9). In this case, the microprocessor (6), after having loaded the memory address from which the transfer must be made into the counter register set (440), and after having set the comparator register set (441), through the signal ACTIE, enables the arbiter (48), and hence the control circuit (430), to generate the essential signals RAS and CAS and the signal EWR to the disk controller (9).

Figure 3C:
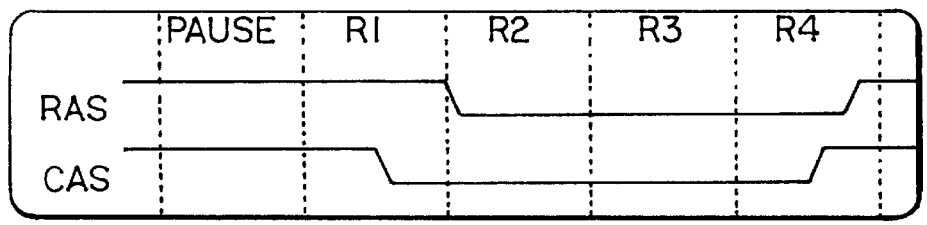

FIG. 3C is a timing diagram illustrating a refresher cycle, which is the second highest priority access after exchanges with the disk controller (9). Refresher cycle accesses are requested by the internal refresh clock circuit (4960) of the coupler circuit (4) and their frequency depends on the programming of bit 3 of the MODE register (494). Both memory banks in the cache memory (5) are refreshed simultaneously, utilizing CAS before RAS.

Figure 3D:
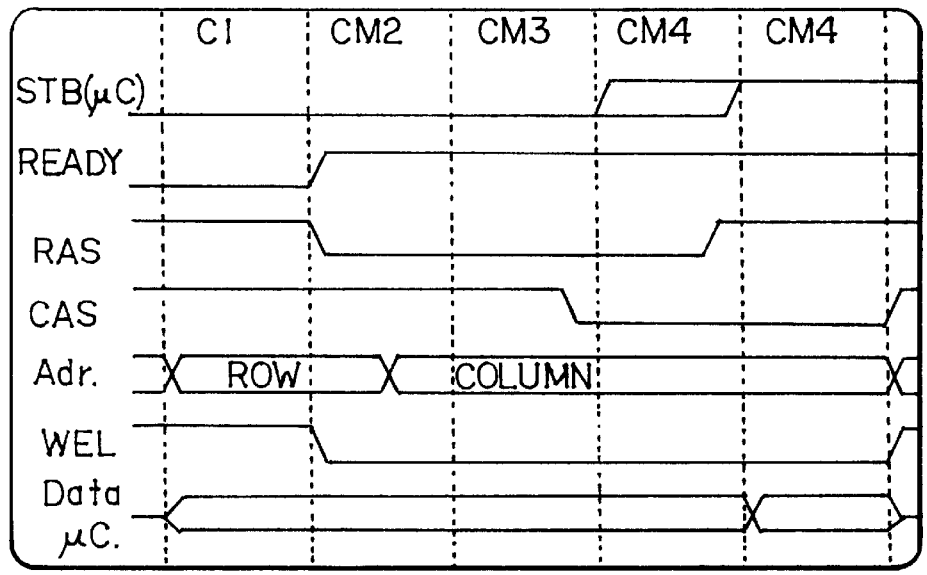
Figure 3E:
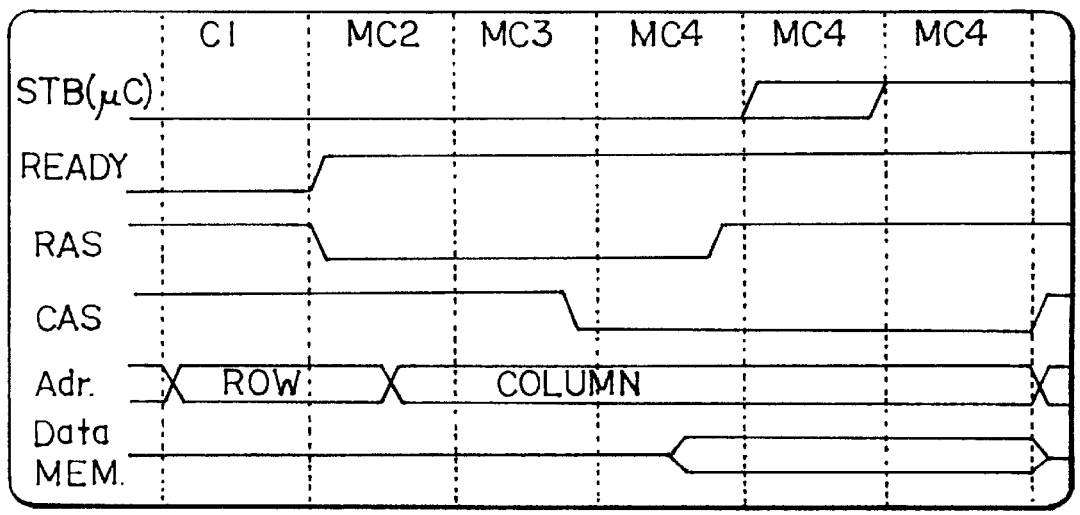

FIG. 3D is a timing diagram illustrating accesses from the microprocessor (6) to the cache memory (5) and FIG. 3E is a timing diagram illustrating accesses from the cache memory (5) to the microprocessor (6). The microprocessor (6) can only access the cache memory (5) if the latter is unoccupied. If the cache memory (5) is occupied or if a higher priority access is requested, the coupler circuit (4) makes the microprocessor (6) wait by deactivating its READY signal until the cache memory (5) is once again accessible. The microprocessor (6), after having supplied signals for the address row and column, sends data signals on the bus (492) and the control circuit (430) generates the RAS, CAS, and WEL signals necessary for writing the data on the bus (492). The microprocessor (6) then sends the corresponding signal IOSTB on line (487, 640) to the buffer register (480) for the arbiter circuit (48).

In the accesses illustrated in FIGS. 3D and 3E, the row address is transmitted by a portion (645) of the address bus CA(0:19) (674) through a buffer (45) to the cache memory (5) and the column address enters the coupler circuit (4) through the bus (64) and exits through the address multiplexer (447) on the bus (452) to the cache memory (5).

Figure 3F:
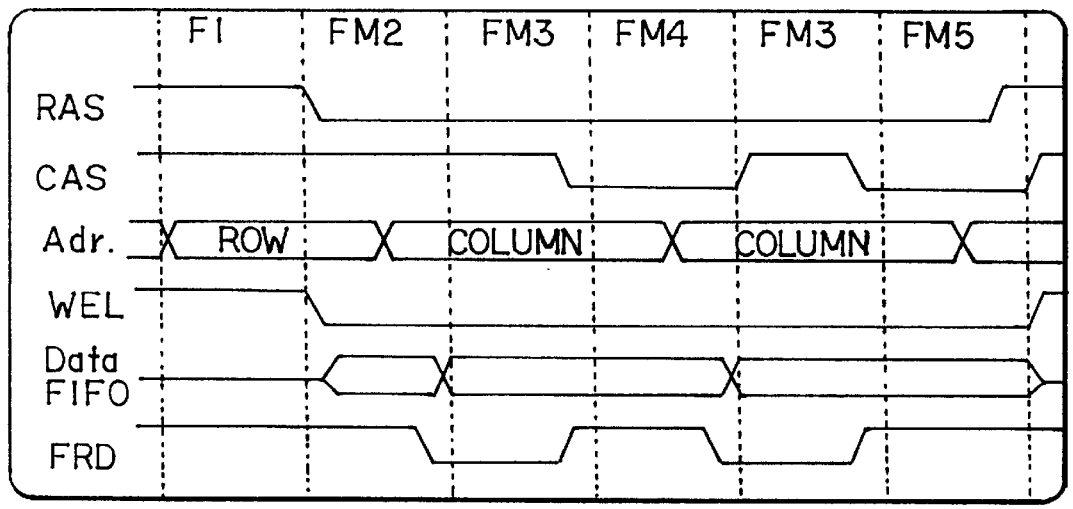
Figure 3G:
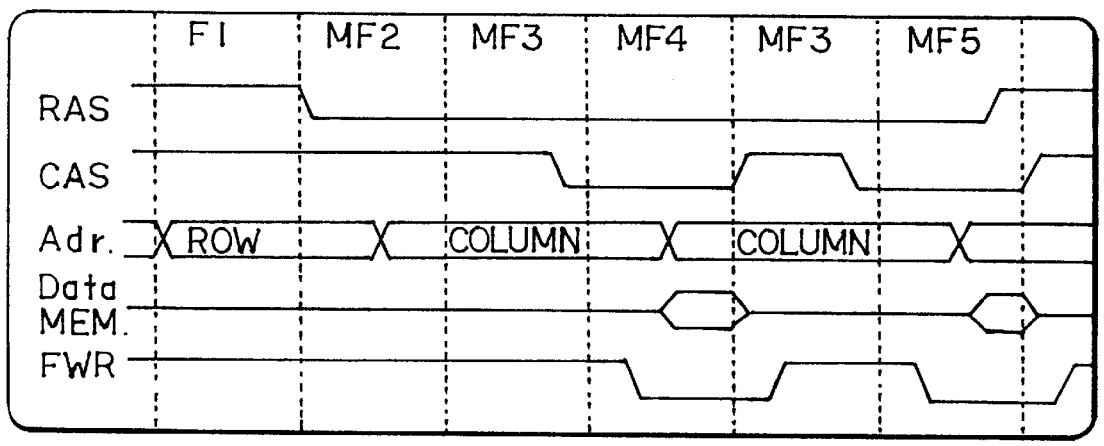
Figure 3H:
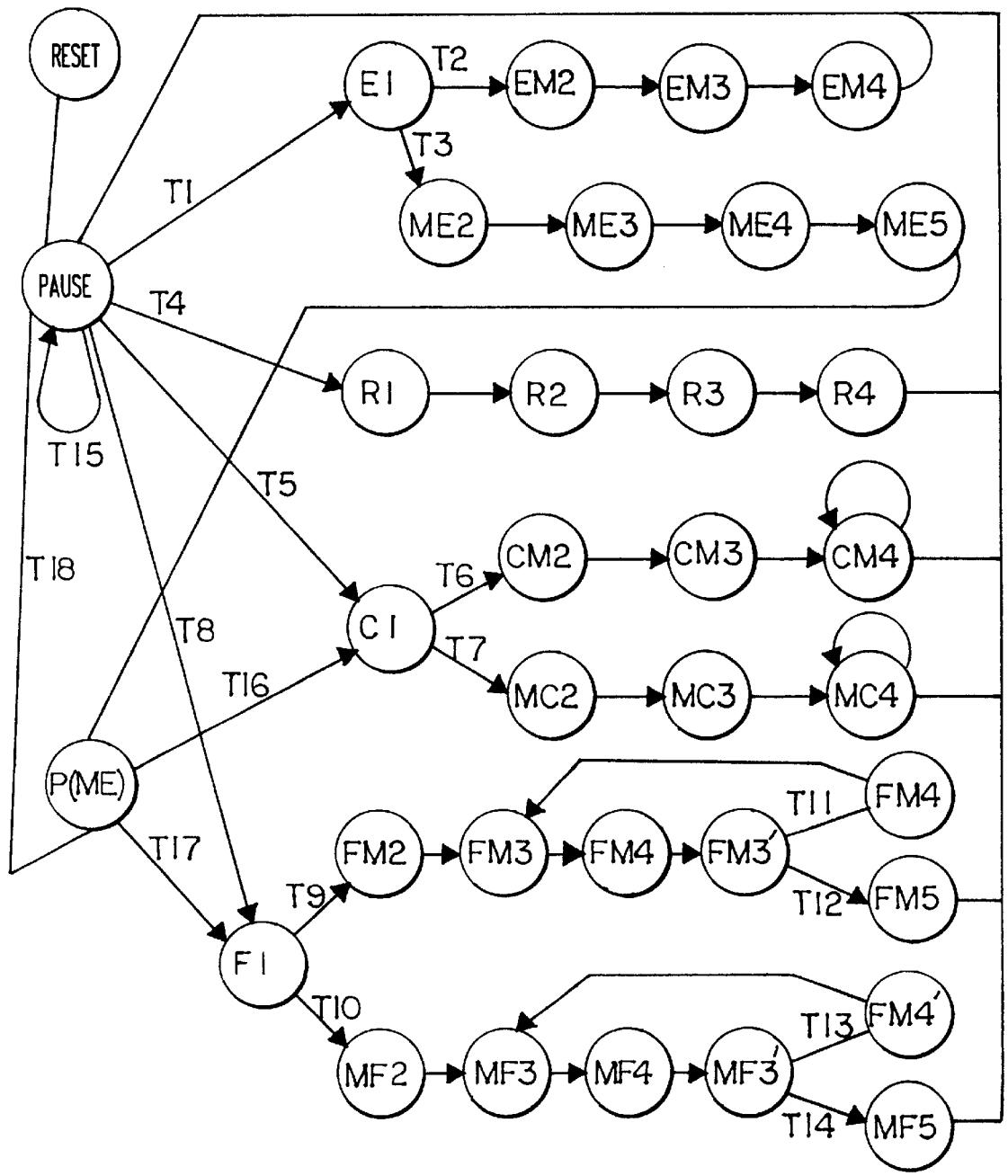
FIG. 3H shows the chaining of the different sequences between themselves and the orders of priority of those sequences.

The accesses with the lowest priorities are the accesses illustrated in FIGS. 3F and 3G, which are accesses between the 4 word FIFO stack (47) and the cache memory (5). These accesses are only possible when there is no other request and if the counter register set (444) and the comparator register set (445) have been loaded by the microprocessor (6) which sets the ACTIF bit in the comparator register set register located at address 04Ah. A FIFO stack (47) access may transfer several eight-bit bytes in a burst. The number of eight-bit bytes is always even and the burst lasts as long as the coupler circuit (4) maintains signal DRQ on line (435, 42) to the interface circuit (2). The length of the burst is determined by bits 6 and 7 of the POS 3 register (402) The arbiter (48) makes use of the page mode of the memories to carry out burst transfers.

In FIG. 3F, after data has been loaded into the FIFO stack (47) via bus (41), the control circuit (430) generates a signal FRD which allows data to be transferred from the FIFO stack (47) to the cache memory (5). The signal WEL, generated by the control circuit (430), allows data to be written to the cache memory (5). When transferring data from the cache memory (5) to the FIFO stack (47), which is shown in FIG. 3G, the control circuit (430) generates address signals and the RAS and CAS signals and, when the cache memory (5) presents its data, generates a signal FWR that allows the data to be written to the FIFO stack (47).

The EPROM memory (8) contains the operating software program for all the circuits on the interface card and it permits the microprocessor (6), according to the signals exchanged between itself and the disk controller (9) or itself and the coupler circuit (4), to activate the previously described accesses, with the exception of the refresher cycle which is initiated by the refresh clock circuit (4960) of the coupler circuit (4). The microprocessor (6), with the aid of the EPROM program memory (8) has, therefore, the role of interpreting the commands coming from the central processor through the MCA bus (1), programming the automation circuitry of the coupler circuit (4) to carry out the transfers, and of commanding the disk controller (9). In addition, the microprocessor (6) manages tables necessary for operation of the cache memory (5). These tables are located in the EPROM memory (8) and include a cache memory allocation table (TAG) which is formatted with 128 4-path lines.

Figure 4:
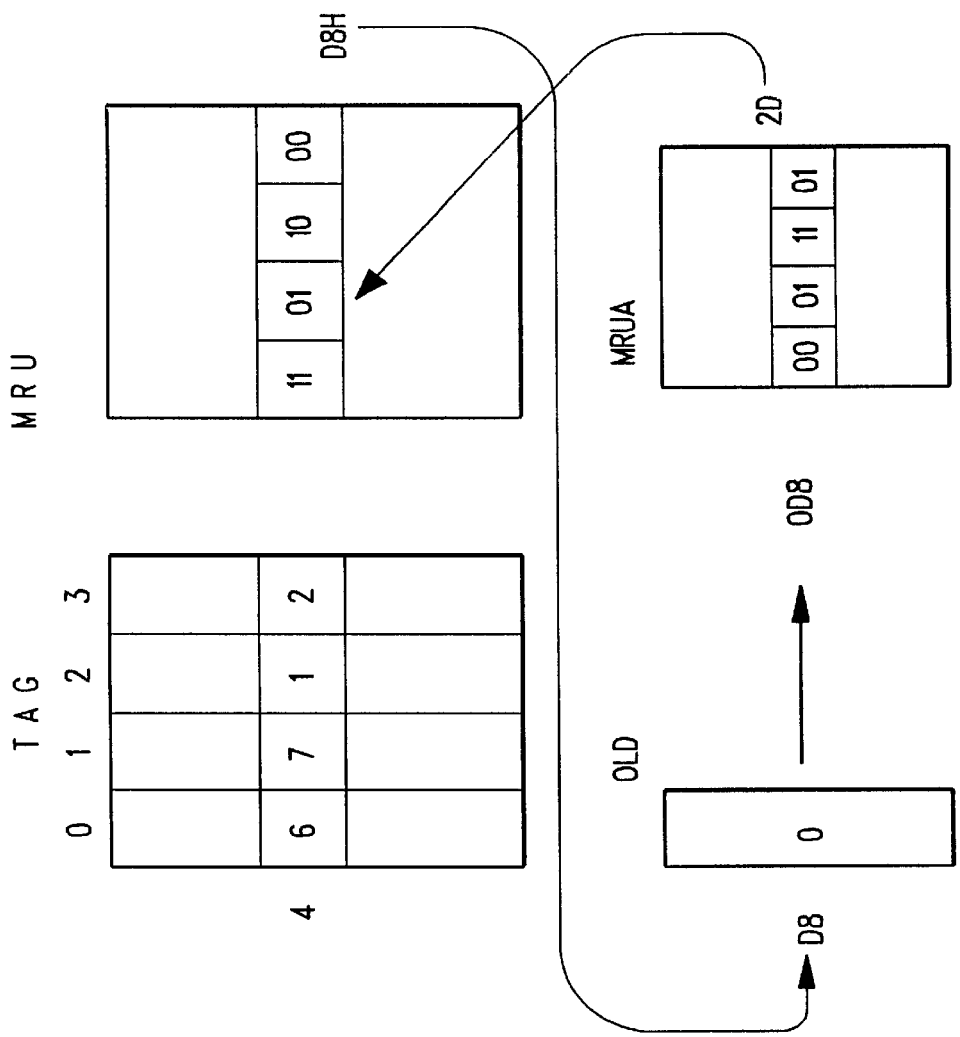
FIG. 4 shows the tables for managing the cache memory.

The sectors of each disk are arranged in blocks, the maximum size of which is the length of a track. The blocks are arranged according to a relative address number of the block (RBA) in the 128 line, 4 column matrix. The lines correspond to the increasing importance of the low-order blocks of the RBA and the columns to blocks of the same low order, but of a quite different order from that of the RBA. The number of columns, called paths, is equal to 4. So, for example, the pertinent address blocks 64, 74, 14 and 24 in FIG. 4 are filed in line 4 and columns 0 to 3 will contain successively the information corresponding to blocks 64, 74, 14, and 24 in FIG. 4. The TAG therefore contains a number of lines corresponding to the low orders of the relative addresses of the blocks, and, in 4 successive columns, the high orders of the block addresses stored in the cache memory (5).

In the example shown in FIG. 4, the TAG contains in line 4 the values 6, 7, 1, and 2 stored in the respective columns 0, 1, 2, and 3. Linked to this TAG is a table (MRU) containing in the corresponding line of the TAG values associated with each path, coded in two bits, representing the seniority of utilization of the path concerned. In the example shown in FIG. 4, the oldest path has the highest value and is, therefore, constituted by the path containing the block 64. When an access to the disk controller (9) is effected, the microprocessor (6) reads the TAG to insure that the block sought is not contained in the cache memory (5). When the block is not contained in the cache memory (5), the microprocessor (6) orders a reading of the disk controller (9) which, for example, if one wants to read block 54, permits reading of the latter and the microprocessor (6) will order the transfer of this block into the cache memory (5) to the memory address in which the oldest block was contained.

To decide into which location the block, or sector, read should be written and to update the value of the MRU, the microprocessor (6) uses a first table (OLD) and a second table (MRUA) less recently utilized and updated. These two tables are also contained in the EPROM memory (8). Reading the contents of the MRU in the corresponding line at the RBA gives a hexadecimal value (D8, for the example considered) which serves as the address for the OLD. The contents of the OLD in the address D8 indicates the number, in this instance 0, of the column in which the block must be replaced, and this column number is linked to the contents of the MRU and constitutes an address (0D8, in the example considered) in the MRUA from which the new value of the contents to be substituted into the MRU at the address (4, in the example considered) corresponding to the low order of the block. In the example considered, the hexadecimal value 2D in fact constitutes the new coding of the MRU which indicates that the path 0 is the most recently used, since that is the one in which the block 54 would have been enterd.

The above-described process by which each block transfer location is determined, which is utilized for both reading from and writing to the cache memory (5), is linked to the INDEX signals which allow the disk sector counters (496, 497) to be reset, since the INDEX signals are sent by the disk controller (9) each time a head passes before sector 0. The INDEX signals reset the disk sector counters (496, 497) of each disk to "0" and reinitiates the incrementation of the disk sector counters (496, 497) according to the incrementation time programmed by the microprocessor (6) based upon the characteristics of the disks to which the interface card is connected. This allows continuous knowledge of the position of a head and, while a head is in motion seeking a disk sector, storage in the cache memory (5) of the disk sectors not requested which may be saved for subsequent use. In the course of these storages, the TAG is updated by the above-described process. This process allows the reading of certain portions of a disk to be anticipated and, thus, the discharging of a request for access to a disk sector made by the MCA bus (1) if the cache memory (5) already contains the disk sector to be read. If it does not contain it, a data transfer is made from the disk controller (9) to the cache memory (5) and then from the cache memory (5), through a FIFO stack access, to the MCA bus (1).

Other modifications easily possible for an expert are also part of the concept of the invention.

It is claimed:

1. A coupler circuit (4) for relieving a microprocessor (6) of directing individual data exchanges between a disk controller (9), a dynamic cache memory (5), and a central processor, said coupler circuit (4) comprising:

means for directing data exchanges between said disk controller (9) and said dynamic cache memory (5) including first circuitry (495, 494, 480, 447, 446, 443, 442, 441, 440, 430, 48) for receiving a disk controller data exchange request signal, for assigning a highest level of priority to said disk controller data exchange request signal, and for providing access control signals to said dynamic cache memory (5), said first circuitry being initialized by said microprocessor (6);

means for refreshing said dynamic cache memory (5) including second circuitry (4960, 494, 480, 430, 48) for generating a refresh cycle request signal, for assigning a second highest level of priority to said refresh cycle request signal, and for providing refresh control signals to said dynamic cache memory (5);

means for directing data exchanges between said microprocessor (6) and said dynamic cache memory (5) including third circuitry (4920, 4500, 480, 447, 430, 402, 48) for receiving a microprocessor data exchange request signal, for assigning a third highest level of priority to said microprocessor data exchange request signal, and for providing access control signals to said dynamic cache memory (5); and means for directing data exchanges between said dynamic cache memory (5) and a stack (47) incorporated into said coupler circuit (4) including fourth circuitry (4500, 480, 447, 446, 445, 444, 430, 402, 48) for receiving a stack data exchange request signal, for assigning a lowest level of priority to said stack data exchange request signal, and for providing access control signals to said stack (47) and said dynamic cache memory (5), said fourth circuitry being initialized by said microprocessor (6).

2. The coupler circuit (4) as defined in claim 1, wherein said first circuitry comprises masking circuitry (495, 494) for masking said disk controller data exchange request signals so as to allow lower priority signals to be processed by said coupler circuit (4).

3. The coupler circuit (4) as defined in claim 2, wherein said microprocessor (6) programs said masking circuitry (495, 494) to provide a selected masking time for said disk controller data exchange request signals.

4. The coupler circuit (4) as defined in claim 1, wherein said first circuitry comprises a counter register (440) for holding a disk controller data exchange starting address of the dynamic cache memory (5) and a comparator register (441) for holding a disk controller data exchange ending address of the dynamic cache memory (5).

5. The coupler circuit (4) as defined in claim 4, wherein said first circuitry further comprises preloader registers (443, 442) for preloading the contents of said counter register (440) and said comparator register (441), respectively, and wherein said microprocessor (6) initializes said first circuitry by loading said preloader registers (443, 442).

6. The coupler circuit (4) as defined in claim 4, wherein said first circuitry further comprises a controller circuit (430) for generating an incrementation signal to increment the address value in said counter register (440).

7. The coupler circuit (4) as defined in claim 1, wherein said second circuitry comprises refresh clock circuitry (4960, 494) for generating said refresh cycle request signals, and wherein said microprocessor (6) programs said refresh clock circuitry (4960, 494) to provide a selected period for said refresh cycle request signals.

8. The coupler circuit (4) as defined in claim 1, wherein said third circuitry comprises multiplexing circuits (4920, 4500) for directing data exchanges between said microprocessor (6) and said dynamic cache memory (5) through said coupler circuit (4).

9. The coupler circuit (4) as defined in claim 1, wherein said fourth circuitry comprises a counter register (444) for holding a stack data exchange starting address of the dynamic cache memory (5) and a comparator register (445) for holding a stack data exchange ending address of the dynamic cache memory (5).

10. The coupler circuit (4) as defined in claim 9, wherein said microprocessor initializes said fourth circuitry by loading said counter register (444) and said comparator register (445).

11. The coupler circuit (4) as defined in claim 9, wherein said fourth circuitry further comprises a controller circuit (430) for generating an incrementation signal to increment the address value in said counter register (444).

12. A method for relieving a microprocessor (6) of directing individual data exchanges between a disk controller (9), a dynamic cache memory (5), and a central processor through the use of a coupler circuit (4), said method comprising the steps of:

having said coupler circuit (4) direct data exchanges between said disk controller (9) and said dynamic cache memory (5) by receiving a disk controller data exchange request signal, assigning a highest level of priority to said disk controller data exchange request signal, and providing access control signals to said dynamic cache memory (5);

having said coupler circuit (4) refresh said dynamic cache memory (5) by generating a refresh cycle request signal, assigning a second highest level of priority to said refresh cycle request signal, and providing refresh control signals to said dynamic cache memory (5);

having said coupler circuit (4) direct data exchanges between said microprocessor (6) and said dynamic cache memory (5) by receiving a microprocessor data exchange request signal, assigning a third highest level of priority to said microprocessor data exchange request signal, and providing access control signals to said dynamic cache memory (5); and having said coupler circuit (4) direct data exchanges between said dynamic cache memory (5) and a stack (47) incorporated into said coupler circuit (4) by receiving a stack data exchange request signal, assigning a lowest level of priority to said stack data exchange request signal, and providing access control signals to said stack (47) and said dynamic cache memory (5).

13. The method as defined in claim 12, wherein said step of having said coupler circuit (4) direct data exchanges between said disk controller (9) and said dynamic cache memory (5) includes masking said disk controller data exchange request signals so as to allow lower priority signals to be processed by said coupler circuit (4).

14. The method as defined in claim 13, wherein said step of masking said disk controller data exchange request signals includes having said microprocessor (6) program a selected masking time for said disk controller data exchange request signals.

15. The method as defined in claim 12, wherein said step of having said coupler circuit (4) direct data exchanges between said disk controller (9) and said dynamic cache memory (5) includes having said microprocessor (6) load preloader registers (443, 442) with a disk controller data exchange starting address of the dynamic cache memory (5) and a disk controller data exchange ending address of the dynamic cache memory (5).

16. The method as defined in claim 15, wherein said step of having said coupler circuit (4) direct data exchanges between said disk controller (9) and said dynamic cache memory (5) includes having said microprocessor (6) initialize the data exchanges between said disk controller (9) and said dynamic cache memory (5) by commanding a transfer of the contents of preloader registers (443, 442) into a counter register (440) and a comparator register (441), respectively.

17. The method as defined in claim 16, wherein said step of having said coupler circuit (4) direct data exchanges between said disk controller (9) and said dynamic cache memory (5) includes having a controller circuit (430) generate an incrementation signal to increment the address value in said counter register (440).

18. The method as defined in claim 12, wherein said step of having said coupler circuit (4) refresh said dynamic cache memory (5) includes having said microprocessor (6) program a selected period for said refresh cycle request signals.

19. The method as defined in claim 12, wherein said step of having said coupler circuit (4) direct data exchanges between said microprocessor (6) and said dynamic cache memory (5) includes directing data exchanges between said microprocessor (6) and said dynamic cache memory (5) through said coupler circuit (4).

20. The method as defined in claim 12, wherein said step of having said coupler circuit (4) direct data exchanges between said dynamic cache memory (5) and said stack (47) includes having said microprocessor (6) load a counter register (444) with a stack data exchange starting address of the dynamic cache memory (5) and a comparator register (445) with a stack data exchange ending address of the dynamic cache memory (5).

21. The method as defined in claim 20, wherein said step of having said coupler circuit (4) direct data exchanges between said dynamic cache memory (5) and said stack (47) includes having a controller circuit (430) generate an incrementation signal to increment the address value in said counter register (444).

* * * * *

UNITED STATES PATENT AND TRADEMARK OFFICE
CERTIFICATE OF CORRECTION

Page 1 of 2

| | | |
|---|---|---|
| PATENT NO | : | 5,829,043 |
| DATED | : | October 27, 1998 |
| INVENTOR(S) | : | Roger Gilet, et al. |

It is certified that error appears in the above-identified patent and that said Letters Patent are hereby corrected as shown below:

Front page [54], Title, "COUPLER CIRCUIT AND ITS USE IN A CARD AND PROCESS", should read --A COUPLER CIRCUIT FOR DIRECTING DATA EXCHANGES BETWEEN A CACHE MEMORY, A DISK CONTROLLER, AND AN MCA BUS--;

Front page [76], Inventors, "Roger Gilet, deceased, late of L'Hay Les Roses, France; by Renale Gilet, administrator, 2, allée des Troënes, l'Hay les Roses, France; Pascal Vergnory Mion, 29, rue de l'avant-garde, 93700 Drancy, France", should read as follows:

--Roger Gilet, L'Hay Les Roses, France, Deceased, by Renate Gilet, L'Hay Les Roses, France, Administratrix of estate of Roger Gilet; Pascal Vergnory-Mion, Drancy, France, Missing, by Renate Gilet, L'Hay Les Roses, France, Administratrix of estate of Roger Gilet--;

Column 1, Title, "COUPLER CIRCUIT AND ITS USE IN A CARD AND PROCESS", should read --A COUPLER CIRCUIT FOR DIRECTING DATA EXCHANGES BETWEEN A CACHE MEMORY, A DISK CONTROLLER, AND AN MCA BUS--;

UNITED STATES PATENT AND TRADEMARK OFFICE
CERTIFICATE OF CORRECTION

PATENT NO : 5,829,043
DATED : October 27, 1998
INVENTOR(S) : Roger Gilet, et al.

It is certified that error appears in the above-identified patent and that said Letters Patent are hereby corrected as shown below:

Column 5, line 48, "request", should read --request DRQ--; and

Column 8, line 3, " "110" ", should read -"0"--.

Signed and Sealed this

First Day of May, 2001

Attest:

NICHOLAS P. GODICI

Attesting Officer      Acting Director of the United States Patent and Trademark Office